United States Patent [19]
Suiter

[11] Patent Number: 6,039,445
[45] Date of Patent: Mar. 21, 2000

[54] AFOCAL WATER-AIR LENS WITH GREATLY REDUCED LATERAL COLOR ABERRATION

[75] Inventor: Harold R. Suiter, Panama City, Fla.

[73] Assignee: The United States of America as represented by the Secretary of the Navy, Washington, D.C.

[21] Appl. No.: 09/120,876

[22] Filed: Jul. 20, 1998

[51] Int. Cl.[7] .............................. G02C 1/00; G02C 11/08; G02B 9/00

[52] U.S. Cl. .............................. 351/43; 351/62; 359/744; 359/796

[58] Field of Search .................................... 359/744, 796; 351/43, 62

[56] References Cited

U.S. PATENT DOCUMENTS

| | | | |
|---|---|---|---|
| 538,182 | 4/1895 | Rudolph | 359/796 |
| 2,088,262 | 7/1937 | Grano | 351/43 |
| 2,730,014 | 1/1956 | Ivanoff et al. | 351/43 |
| 3,055,256 | 9/1962 | Andresen, Jr. | 351/43 |
| 3,227,041 | 1/1966 | Muszumanski | 359/744 |
| 3,672,750 | 6/1972 | Hagen | 351/43 |
| 5,094,520 | 3/1992 | Reshef et al. | 351/43 |
| 5,204,782 | 4/1993 | Mercado et al. | 359/796 |
| 5,359,371 | 10/1994 | Nolan | 351/43 |
| 5,363,151 | 11/1994 | Biays et al. | 351/43 |
| 5,420,649 | 5/1995 | Lewis | 351/43 |
| 5,523,804 | 6/1996 | Nolan | 351/43 |

*Primary Examiner*—Georgia Epps
*Assistant Examiner*—Evelyn A. Lester
*Attorney, Agent, or Firm*—Harvey A. Gilbert; Donald G. Peck

[57] ABSTRACT

An afocal lens system is provided between two different mediums having different indices of refraction and dispersion values, and is used in such devices as diver-masks. The lateral chromatic aberration inherent in the usual flat-surface of a transparent protecting mask is greatly reduced. This is done by an arrangement which combines a positive low dispersion lens with a negative high dispersion lens in various arrangements with each other.

8 Claims, 1 Drawing Sheet

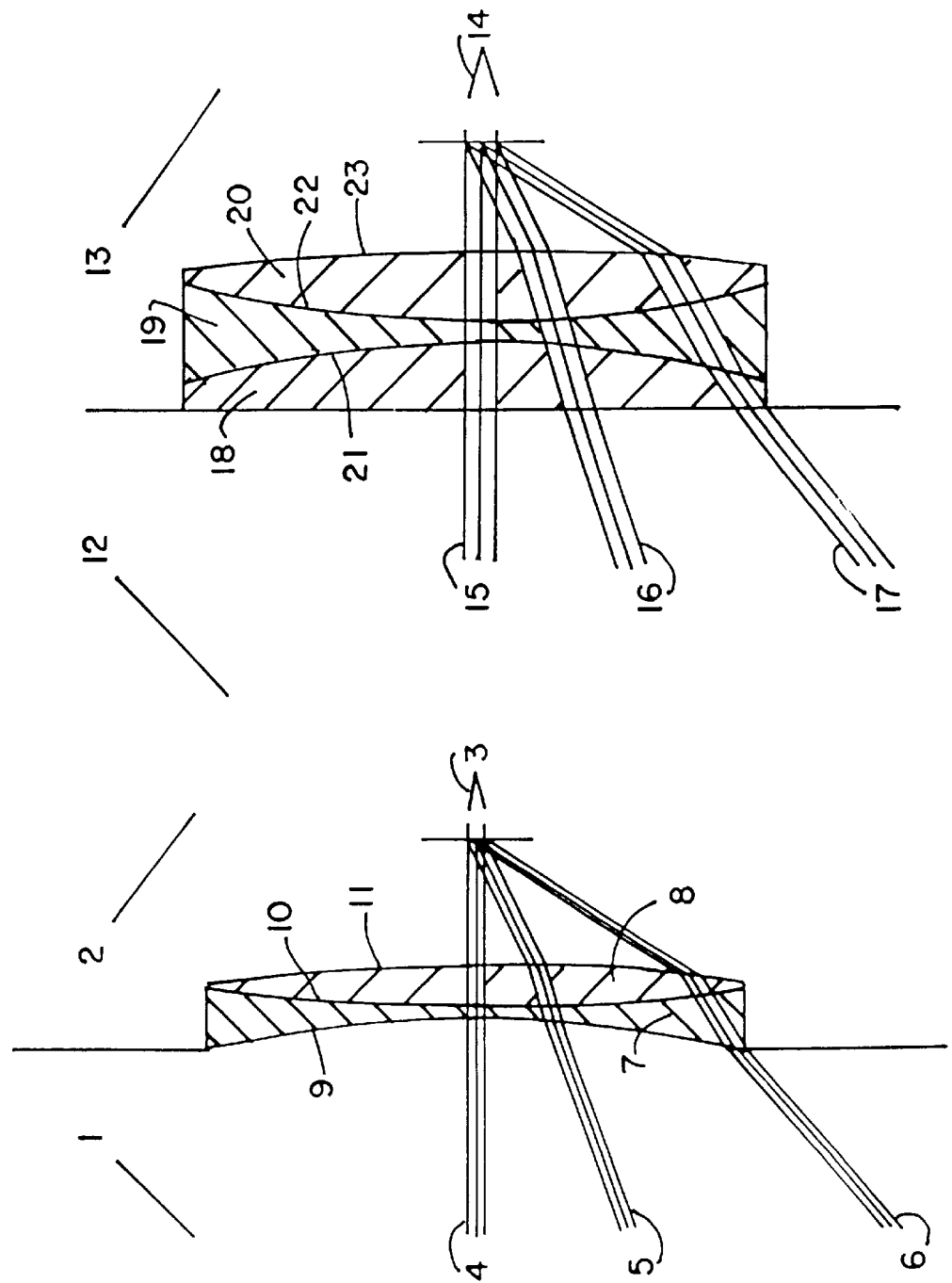

AFOCAL WATER-AIR LENS WITH GREATLY REDUCED LATERAL COLOR ABERRATION

TECHNICAL FIELD

The present invention generally relates to lens systems used between two mediums having different indices of refraction and dispersion values. In particular, the present invention is directed to an afocal lens system in a diver-mask or similar device that reduces the aberration known as lateral color or lateral chromatic aberration.

BACKGROUND ART

It has been typical to neglect lateral chromatic aberration in diver's vision in the past. Lateral chromatic aberration occurs with off-axis light between two media. This aberration leads to blurry vision toward the edge of the field of view. Partly this neglect stems from the strongly filtered light visible at significant depths. However, it has also been assumed that the diver will merely turn his or her head to center the viewed object in front of the eyes. While this is expeditious, it does not allow a good field of clear vision. When there is sufficient light across the spectrum, the diver's visual acuity is limited by lateral chromatic aberration. This occurs in recreational dives in shallow, clear water. It also occurs in dives in deeper water where the illumination is from a wide-band artificial source.

Because of the strangeness of the environment, divers are often not aware of the lateral chromatic aberration inherent in their masks. Salvage divers looking for small items on the bottom might pass by an object and miss it merely because it is off-axis in the field. They cannot afford to direct their heads at precisely every minute area of bottom surface. Even though they are sweeping the bottom with their eyes, the view is seriously disturbed off-axis. In the case of a conventional camera lens which has been designed for use in air, optical performance is also seriously disturbed by an unusual change of medium placed before the lens.

An afocal lens system takes a parallel ray of light on the input side and processes them into exiting parallel rays of light having different optical properties. The most common optical property that is modified is angular magnification, but other properties may be selected for optimization. In the cases described here, the lens system is only afocal when operated between the media for which it has been designed.

Monochromatic light in a parallel beam does not undergo focusing or defocusing during passage through a plane piece of glass or transparent plastic when that glass or plastic is used to separate water from air in a diver-mask or an underwater camera-lens protector. Thus, the simple window is afocal. However, the light beam is refracted, according to Snell's Law of Refraction:

$$n_{water} \sin(\Theta_{water}) = n_{air} \sin(\Theta_{air}) \quad \text{(Equation 1)}$$

where $n_{water}$ is the index of refraction in water and $\Theta_{air}$ is the angle of incidence in water. The other variables are defined similarly. The indices of refraction are generally adjusted so that the index in air is unity. A flat window is not a factor because refraction that occurs at the entrance face is undone at the exit face, with an accumulated refraction of zero.

If the values of the indices of refraction were independent of color, there would be no opportunity for lateral color to be introduced into the view of a camera lens or the field of vision of an observer. However, they are not. A somewhat restricted light spectrum representative of the usable spectrum in shallow, well-lit seawater is depicted in Table 1. The refraction angles are calculated for light incident at an angle 40 degrees from an axis perpendicular to the plane of the lens.

TABLE 1

| Wavelength (nm) | Index of Seawater | Refracted Angle in Air (40 degrees in seawater) |
| --- | --- | --- |
| 1 0.480 | 1.3438906 | 59.750 |
| 2 0.550 | 1.3407800 | 59.523 |
| 3 0.620 | 1.3386056 | 59.366 |

Table 1 demonstrates that eventhough the index of refraction of seawater varies by only about 4 parts in a thousand over this spectral range, there results a 0.38 degree, or 23 arcminute, error. Dispersion is the change of index of refraction verses wavelength. Low-dispersion materials have lowered differences of index of refraction for the same wavelength change than high-dispersion materials. The identity of the material as either a low dispersion or a high dispersion material is a relative concept. For purposes of the present application, low-dispersion refers to a material around the dispersion level of water, and high-dispersion refers to the material with a higher dispersion level than that of water. Normally human vision can resolve two lines separated by 1 to 1.5 arcminutes. Consequently the blurring caused by a 23 arcminute difference is considerable.

By manipulation of Snell's law in equation 1 it can be shown that, to a very good approximation $$\Delta\Theta = [(n_3/n_1) - 1] \tan \Theta$$

where $n_1$ is the index in water at wavelength 1; and $n_3$ is the index in the water of a wavelength 3; and, $\Delta\Theta = \Theta_3 - \Theta_1$ is the difference in propagation angles of these two wavelengths in air. The value $\Theta$ is the propagation angle in air at a wavelength 2. It can be seen from the aforementioned formula that the difference in refraction $\Delta\Theta$ can be decreased either by turning the head of the viewer so that $\Theta$ is minimized or by strongly filtering the light.

Divers have manages to live with this optical problem for years, primarily because of two reasons. The first reason is the strong filtering of deeper water resulting in a quasimonochromatic distribution (toward the blue) of available light. The second reason is that they quickly learn, consciously or unconsciously, to turn their heads or bodies to center the object in the faceplate if they want to look closely at it.

As a consequence of this training and filtering, there has been little attention devoted to lateral chromatic aberration in the design of diver masks. In *Human Vision Underwater: Physiology and Physics*, by Jo Ann S. Kinney, the only form of chromatic aberration mentioned is longitudinal chromatic aberration (p.80), and then only in the eye. In U.S. Pat. Nos. 5,523,804 and 5,359,371 to Nolan, color is mentioned but only as it relates to the natural filtering of water. In U.S. Pat. No. 5,420,649 to Lewis, lateral color is mentioned, but only as it relates to removing the spectral effects of prisms placed on the inside of a diver's mask to divert light.

In the case of optical windows used to protect cameras designed for use in air, most photographers are willing to restrict the field of vision to achieve reasonable imaging of cameras normally designed for air use when employed underwater looking through the window of a dry box. But there is no physical limitation requiring that this compromise be made. Cameras designed for underwater use usually have special lenses that work immersed in water with minimum lateral color. However, there are special circumstances where such a camera lens may not yet be fitted to a specific advanced imaging system. In such a case, a dry box must be employed and it is necessary to adapt a lens, that normally operates in air, to a water medium. Thus, the situation is not adequately addressed by conventional systems and techniques.

SUMMARY OF THE INVENTION

Accordingly it is one object of the present invention to provide an afocal lens system that reduces the lateral chromatic aberration inherent in the usual flat-surface diver's mask between a water environment and an air cavity defined by the mask.

Another object of the present invention is to provide an afocal lens system that reduces the lateral chromatic aberration inherent in the usual flat-surface window between a water environment and an air cavity defined by a dry-box used to keep a camera dry.

A further object of the present invention is to provide an optical mask that affords easy viewing of small objects.

It is an additional object of the present invention to provide an optical system separating two mediums having different indices of refraction and dispersion values whereby radial blurring is reduced.

It is yet a further object of the present invention to provide an optical converter for a camera lens that allows the camera lens to operate reasonably well immersed in a medium having a different refractive index than the medium for which the camera lens was designed to be operated, such as air.

These and other goals and objects of the present invention are accomplished by an afocal lens arrangement separating first and second mediums, each having two different indices of refraction and dispersion values. Radial blurring is reduced by a compensating mechanism which reduces lateral chromatic aberration that is normally inherent to such lens arrangements.

BRIEF DESCRIPTION OF THE DRAWINGS

FIG. 1 is a cross sectional schematic depicting a first embodiment of the present invention.

FIG. 2 is a cross sectional schematic depicting a second embodiment of the present invention.

DETAILED DESCRIPTION OF THE PREFERRED EMBODIMENT

FIG. 1 depicts an embodiment for a diver's mask lens. The left half-space in the drawing (labeled by 1) is seawater. The right half-space in (labeled 2) is air. The eye's center (of an observer wearing the mask) is labeled 3, and is interpreted as the nodal point. The aperture stop of the optical system (the iris of the eye) swings around to interpret the incoming ray bundle at a small distance forward of the nodal point. Axial light is denoted by the three-ray bundle 4, and the optics depicted in FIG. 1 are comprised of conventional concave-concave and convex—convex lenses.

Additional ray bundles are labeled 5 and 6 at 20 and 40 degrees respectively. Rays at −20 and −40 degrees, as well as the remaining rays between these angles, have been omitted for graphical clarity. Light follows the usual convention in such drawings as proceeding from left to right.

Both diagrams (FIGS. 1 and 2) are cross sections taken through the optical access. The three dimensional lens shapes are derived by spinning the cross sections about the optical axis. Thus, the diagrams represent circularly-symmetric three-dimensional objects.

The materials in the preferred embodiment of the diver-mask lens, are a first portion of polycarbonate, labeled 7, and a second portion of acrylic, labeled 8.

These materials were selected for lightness, toughness, dispersion and transparency. However, other materials may be used, with the stipulation that the higher dispersion material precede the lower dispersion material in the order that light encounters the lenses. Also, the two-lens portions are shown in contact, but this is a matter only of convenience. Separated single-lens portions can be used instead of contact doublet, but such an arrangement involves needless complexity in exchange for very little real benefit.

The radius of the first surface adjacent medium 1 is labeled 9, the radius of the second surface is labeled 10, and the radius of surface 3 is labeled 11. The distance between the last lens element and the nodal point is set in this embodiment at 20 mm, but it can be set at any value and the appropriate parameters adjusted. The nodal point should be near the center of the eye, meaning that eye relief is less than 20 mm. The result of increasing this distance is an increase in the necessary diameter of the lens.

The aperture stop has been selected to be 4 mm for good eye resolution. The radii of curvature, thicknesses, materials, and diameters of the best embodiment of the diver-mask lens are summarized in Table 2. The object distance is infinity, but the object being viewed may not be at infinity to be viewed well. The index of refraction parameters appear in Table 3.

In the diver mask embodiment, a lens is designed to be centered over each eye. The lens diameter of the lens diameter of this variation of a diver mask embodiment exceeds the typical interpupillary distance of about 65 mm. This means the two individual lenses will need to be truncated to meet near the bridge of the nose.

TABLE 2

| Surface | Radius | Thickness | Material | Lens Diameter |
|---|---|---|---|---|
| 0 | Infinity | | | |
| | | Infinity | Seawater | |
| 1 | −186.467 mm | | | 90.75 mm |
| | | 3 mm | Polycarbonate | |
| 2 | 546.245 mm | | | 90.75 mm |
| | | 7 mm | Acrylic | |
| 3 | −330.98 mm | | | 90.75 mm |
| | | 20.0 mm | Air | |
| 4 | (nodal point) | | | 4 mm |

TABLE 3

| Surface | Material | 0.480 | 0.550 | 0.620 |
|---|---|---|---|---|
| | | (Light wavelength in micrometers) | | |
| 0 | Seawater | 1.32389 | 1.34078 | 1.33861 |
| 1 | Polycarbonate | 1.60065 | 1.58959 | 1.58257 |
| 2 | Acrylic | 1.49832 | 1.49358 | 1.49027 |
| 3 | Air* | 1.0 | 1.0 | 1.0 |

*All indices of refraction are referenced to air.

FIG. 2 depicts an embodiment directed to a camera-box window for a protective underwater enclosure. Label 12 indicates the half-space occupied by the seawater medium. Label 13 indicates the air side containing the camera entrance pupil, labeled 14. Label 15 denotes the on-axis light ray bundle. The optics in FIG. 2 are properly represented if the diagram is revolved about the central light ray of ray bundle 15. Additional light ray bundles are labeled 16 and 17 at 20 and 40 degrees respectively. Light rays at angles of −20 and −40 degrees, as well as the other light rays including those between these angles, have been omitted for graphical clarity. Light follows the usual convention in such drawings as proceeding from left to right.

The materials in the embodiment of the camera-window lens, have been chosen to be fused silica, (labeled 18), Schott F2 a flint glass, (labeled 19), and Schott BK7, borosilicate crown (labeled 20). Schott refers to Schott Glass Technologies, Inc. of Duryea, Pa., or Mainz, Germany, and the constitution of each subject material type is well-known to those skilled in this technology. Other materials, whether they be glass or plastics, may be used with the stipulation that the higher dispersion material be at the center of the window triplet. In this case, the silica element has been added to provide a tough protective element on the outer portion of the unit. The outer surface of the silica is flat so that it can be conveniently placed in contact with an existing flat window, but this flatness is not a necessary feature of the invention.

The three window elements are also shown in contact, but this is only a matter of convenience. Separated single elements can be used instead of a triple combination of elements in contact with adjacent elements. However, such separation involves needless complexity, and results in very little real benefit.

The outer radius (radius of surface 1) is infinity. The radius of surface 2 is labeled 21, the radius of surface 3 is labeled 22, and the radius of surface 4 is labeled 23. The distance between the last lens element and the nodal point is set in this example at 20 mm, but it can be set at any value and the parameters adjusted. Accordingly the result of increasing the distance between lens and nodal point is an increase in the necessary diameter of the lens. In the case of a fixed camera lens, the nodal point is the same as the aperture stop. The aperture stop of the camera-window embodiment has been increased from the diver-mask embodiment to 6 mm for allow a typical aperture of a small video camera. The radii of the curvature, thickness, materials, and diameters of the embodiment of the camera-window lens are summarized in Table 4. The index of refraction parameters appear in Table 5.

TABLE 4

| Surface | Radius | Thickness | Material | Lens Diameter |
|---|---|---|---|---|
| 0 | Infinity | | | |
| | | Infinity | Seawater | |
| 1 | Infinity | | | 108.68 mm |
| | | 12 mm | Silica | |
| 2 | −204.32 mm | | | 108.68 mm |
| | | 4 mm | Schott F2 | |
| 3 | 254.43 mm | | | 108.68 mm |
| | | 12 mm | Schott BK7 | |
| 4 | −442.88 mm | | | 108.68 mm |
| | | 20 mm | Air | |
| 5 | (nodal point or aperture stop) | | | 6 mm |

TABLE 5

| Surface | Material | 0.480 | 0.550 | 0.620 |
|---|---|---|---|---|
| | | (Light wavelength in micrometers) | | |
| 0 | Seawater | 1.34389 | 1.34078 | 1.33861 |
| 1 | Silica | 1.46350 | 1.45991 | 1.45740 |
| 2 | Schott F2 | 1.63310 | 1.62366 | 1.61746 |
| 3 | Schott BK7 | 1.52283 | 1.51852 | 1.51554 |
| 4 | Air* | 1.0 | 1.0 | 1.0 |

*All indices of refraction are referenced to air.

Viewing the underwater world through the afocal window lens of the present invention allows the camera lens to recover the full performance inherent in its design.

The present invention is divided into two embodiments: 1) diver-mask lens; and, 2) the camera-lens window. The materials used for the present invention may vary, but the two contemplated embodiments have many of the same characteristics. These lenses, although designed for seawater, could also serve unmodified in fresh water. If fresh water specialization is desired, the lens parameters could be slightly adjusted for optimum use in fresh water.

For a diver-mask lens; the water face is shallow and leads into a negative element with high dispersion, which is preferably in contact with a positive element having low dispersion. In an alternative manner of interpreting the diver-mask, a shallow volume of water can be interpreted to bulge inward into the mask, and as such can be considered part of the active optical system. Thus, the system becomes a triple element system with a negative high dispersion lens elements between two positive low dispersion elements. The net power of the system would be zero (i.e., it is afocal), and the lateral chromatic aberration of the system is minimized at the edge of the field of view. The aperture stop is behind the system slightly in front of the position of the middle of the eye of the diver using the mask. The bulge on the front of the mask created by the seawater constitutes an optically inactive thick flat plate and an optically-active shallow lens. To compensate for this the virtual lens constituted by the seawater is replaced with a real piece of glassy material, such as fused silica, with a similar dispersion value. Once this is done, only a minor adjustment of the curve of lens is necessary.

As an alternative arrangement directed to the camera-lens window, the inward protrusion of the front face of the mask has been replaced by the silica or other low-dispersion glass element to achieve convenience in adapting the lens for use within a dry, protective camera enclosure. However, the principal of the lens is the same. A negative lens of higher dispersion is sandwiched between two positive element of lower dispersion. The net power of the system is zero (i.e., it is afocal), and the lateral chromatic aberration of the system is minimized at the edge of the field of view. The aperture stop is behind the system coincident with the optical position of the camera's iris, which is itself placed at the nodal point.

While a plurality of embodiments have been shown by way of example, the present invention is not limited thereby. Rather, the present invention encompasses all variations, permutations, adaptations, modifications, as well any other version, form or embodiment that would occur to one skilled in this art, who has been taught the present invention by this application. Consequently, the present invention should be construed to be limited only by the following claims.

I claim:

1. An afocal lens arrangement configured as a protective barrier separating first and second mediums having two different indices of refraction and dispersion values, said afocal lens arrangement comprising compensating means for reducing lateral chromatic aberration;

wherein said compensating means comprise:

(a) a first portion adjacent to said first medium and comprising a negative lens of relatively high dispersion value and having two concave sufaces; and, (b) a second portion adjacent said second medium and said first portion and comprising a positive lens of relatively low dispersion value and having two concave surfaces.

2. The afocal lens arrangement of claim 1, wherein said first portion is polycarbonate, and said second portion is acrylic.

3. The afocal lens arrangement of claim 2, wherein said arrangement constitutes a diver-mask.

4. The afocal lens arrangement of claim 3, wherein said afocal lens arrangement is arranged in two separate eye pieces.

5. The afocal lens arrangement of claim 1, wherein said first portion and said second portion are separated from each other.

6. An afocal lens arrangement configured as a protective barrier separating first and second mediums having two different indices of refraction and dispersion values, said afocal lens arrangement comprising compensating means for reducing lateral chromatic aberration, wherein said compensating means comprise:

(a) a first portion adjacent said first medium and comprising a positive low dispersion lens;

(b) a second portion adjacent said second medium and comprising a positive low dispersion lens; and, (c) a middle portion arranged between said first and second portions and comprising a negative high dispersion lens.

7. The afocal lens arrangement of claim 6, wherein said positive low dispersion lens of said first portion comprises a lens having a flat surface and a convex surface, and said positive low dispersion lens of said second portion comprises a lens having two convex surfaces, and said negative high dispersion lens of said middle portion comprising a lens having two concave surfaces.

8. The afocal lens system of claim 6, wherein said first portion is fused silica, said second portion is borosilicate crown and said middle portion is flint glass.

* * * * *